United States Patent [19]

McLaren et al.

[11] Patent Number: 4,743,062
[45] Date of Patent: May 10, 1988

[54] VEHICLE DOOR ASSEMBLY

[75] Inventors: John W. McLaren, Beaverton; Jeffery D. Zawisza; Walter E. F. Rupprecht, both of Midland, all of Mich.

[73] Assignee: The Dow Chemical Company, Midland, Mich.

[21] Appl. No.: 909,820

[22] Filed: Sep. 19, 1986

[51] Int. Cl.$^4$ .............................................. B60J 5/04
[52] U.S. Cl. .................................. 296/146; 296/188; 49/502
[58] Field of Search .................. 296/146, 188; 49/502, 49/348, 352; 188/371, 501, 503

[56] References Cited

U.S. PATENT DOCUMENTS

| | | | |
|---|---|---|---|
| 3,700,076 | 10/1972 | Forsting et al. | 49/502 |
| 3,718,364 | 2/1973 | Fisher et al. | 296/146 |
| 3,782,036 | 1/1974 | Clark et al. | 49/502 |
| 3,791,693 | 2/1974 | Hellriegel et al. | 296/146 |
| 3,938,288 | 2/1976 | Roubinet | 296/146 |
| 4,090,734 | 5/1978 | Inami et al. | 296/146 |
| 4,434,580 | 3/1984 | Engelsberger et al. | 296/146 |

FOREIGN PATENT DOCUMENTS

| | | | |
|---|---|---|---|
| 2021906 | 11/1971 | Fed. Rep. of Germany | 296/146 |
| 48-31622 | 4/1973 | Japan . | |
| 54-20423 | 2/1979 | Japan . | |
| 55-87817 | 6/1980 | Japan . | |
| 142714 | 11/1981 | Japan | 296/146 |
| 154321 | 11/1981 | Japan | 296/146 |
| 58-152414 | 10/1983 | Japan . | |

Primary Examiner—Robert R. Song
Attorney, Agent, or Firm—Timothy S. Stevens; John K. McCulloch

[57] ABSTRACT

A vehicle door and reinforcement assembly therefor comprising a reinforcing beam hinged at one edge to the vehicle and slideably accommodated in a cavity provided within the door. The door and beam are assembled by first hinging the beam to the vehicle and thereafter sliding the door onto the beam. Suitable fasteners secure the door to the beam.

34 Claims, 2 Drawing Sheets

VEHICLE DOOR ASSEMBLY

This invention relates to a vehicle door and structural reinforcement therefor and to methods of assembling the door and reinforcement with one another and with a vehicle.

BACKGROUND OF THE INVENTION

In the assembly of vehicles the fitting of doors to the vehicle frame is one of the most labor intensive and time consuming operations. This is due to the necessity of performing a number of intricate, manipulative operations in assembling the window, window operating mechanism, and the door lock mechanism with the door after the door has been fitted to the vehicle. Regardless of whether the vehicle doors are formed of metal, plastic, or a combination of metal and plastic, the window, window operating mechanism, and lock operating mechanism must be assembled in a space or cavity between inner and outer panels forming the door. Modern vehicles conventionally include a finish or trim panel overlying the inner door panel. In some instances the trim panel is omitted from the door until the door is fitted to the vehicle and the window, lock, and associated operating mechanisms are installed. Thereafter, the trim panel may be fitted to the inner door panel after which the operating levers, cranks, and switches are connected to their respective mechanisms.

In other current door assembly operations a hollow door may be fitted with a transverse reinforcement beam to provide protection for the vehicle occupants against transversely applied impacts. The presence of such beams increases the difficulty in installing the window and lock operating mechanisms in the space between the inner and outer door-forming panels. In such operations the installer utilizes the same or other openings in the inner panel to effect manual mounting and connection of the window and lock components. Thereafter, the inner trim panel and operating cranks, levers, or switches are installed.

Regardless of the methods currently used to assemble doors with vehicles and to incorporate in such doors reinforcement beams, windows, window adjusting mechanisms, and lock operating mechanisms, the assembly operations are laborious and may result in injury to assemblers when moving their hands and arms through the space between the inner and outer panels.

The principal object of the present invention is to provide a door and reinforcement therefor and a rapid, and effective method of assembling the door with the reinforcement and with a vehicle and which materially minimizes or overcomes the difficulties referred to above.

SUMMARY OF THE INVENTION

Apparatus constructed and assembled in accordance with the invention comprises a closure member or door for a vehicle having a doorway located between a pair of spaced apart vehicle frame members so as to provide convenient ingress and egress to and from the vehicle's interior. The door is of such width as to span the doorway and is composed of inner and outer panels spaced apart by webs at opposite ends of the door. Adapted for slideable accommodation in the space between the inner and outer door panels is a reinforcing cartridge assembly including a beam of such length as to span the width of the door and the space between the vehicle frame members to provide protection for a vehicle occupant against transversely and longitudinally directed impacts.

One end of the beam preferably is wider than the opposite end and the wider end is provided with hinge leaves that are adapted to be secured to the vehicle frame member at one edge of the doorway, thereby enabling the beam itself to swing about a hinge axis. One end of the door has an opening therein of such size as to accommodate the wider end of the beam, as well as other parts of the cartridge assembly, thereby enabling the door to be slid onto the beam after the latter has been hinged to the vehicle frame. Preferably, the door and the cartridge assembly have cooperable guides which engage one another and support the door as it is assembled with the beam.

That end of the beam remote from its hinged end may carry a support for the door latching and locking mechanism. The cartridge assembly also carries a linkage adapted to be coupled to a handle or lever by means of which the door locking linkage may be actuated from within the vehicle.

If the vehicle closure is one that is provided with a movable window glass, the cartridge assembly includes glass supporting and adjusting means. The glass supporting and adjusting means are incorporated in the cartridge assembly prior to its assembly with the door, and the opening at that edge of the door through which the beam is inserted is sufficiently large to accommodate not only the beam, but also the glass and its supporting and adjusting means.

THE DRAWINGS

Apparatus constructed in accordance with the invention is disclosed in the following description and in accompanying drawings, wherein.

DETAILED DESCRIPTION

Figure 1:
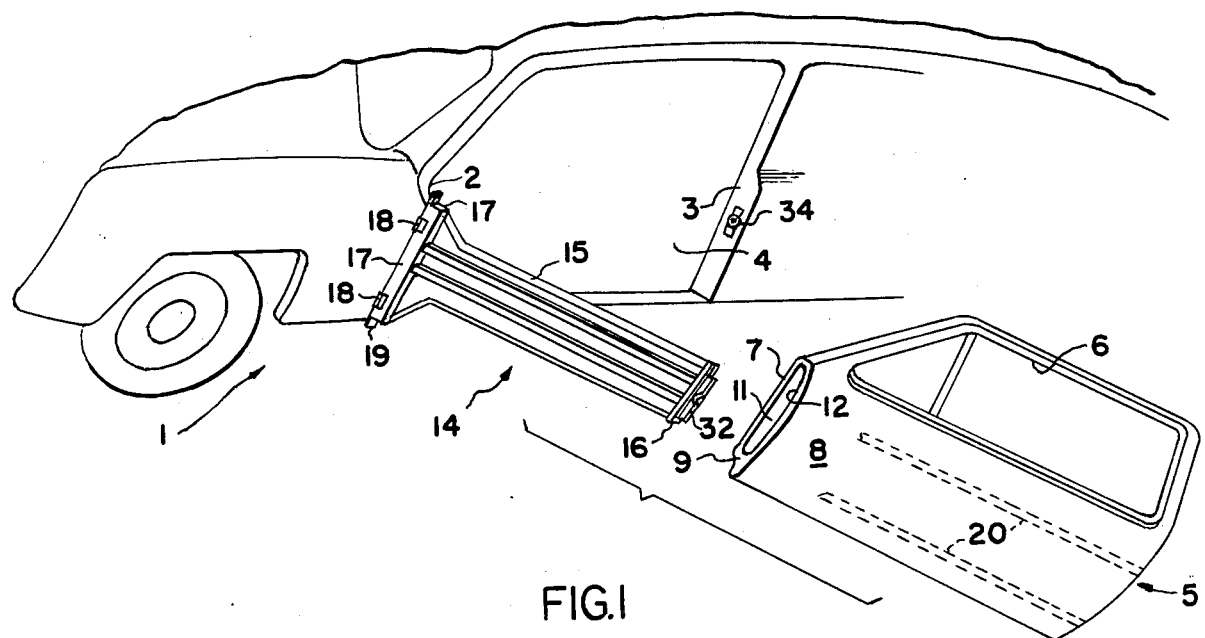
FIG. 1 is a fragmentary, diagrammatic, isometric view of the essential components of the invention.
Figure 2:
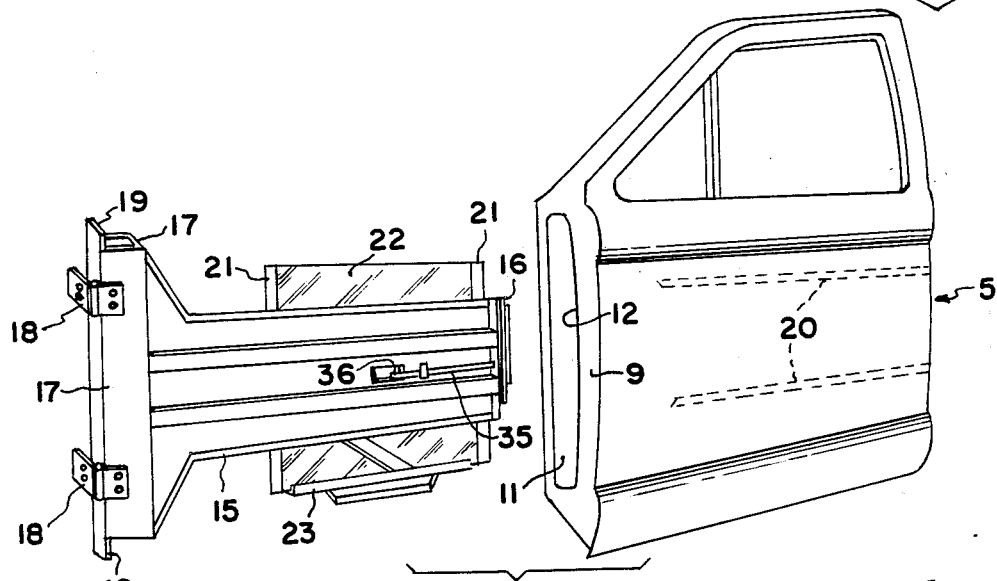
FIGS. 2 and 3 are views similar to FIG. 1, but illustrating the component parts in more detail.
Figure 3:
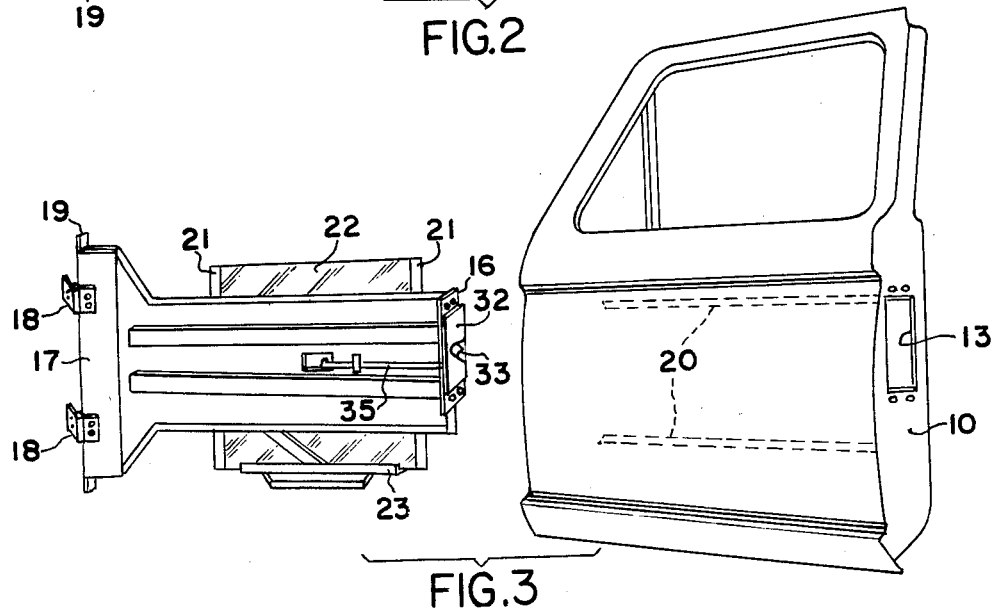

Apparatus constructed in accordance with the embodiment of the invention illustrated in FIGS. 1-4 is adapted for use with an automotive vehicle 1 having a chassis provided with spaced apart forward and rearward frame members 2 and 3, respectively, forming a doorway 4 to facilitate ingress and egress to and from the interior of the vehicle. The vehicle conventionally is equipped with a closure or door 5 having an opening 6 therein that normally may be closed by a window glass (not shown in FIG. 1). The door may be formed of metal, or plastic, or a combination thereof and includes an inner panel 7 and an outer panel 8 spaced from one another at opposite ends of the door by webs 9 and 10 (FIG. 3). The separation of the panels 7 and 8 forms a cavity or chamber 11 that extends the full length of the door. The forward web 9 has an opening 12 therein and the rearward web 10 has an opening 13, both of such openings being in communication with the cavity 11.

It is conventional practice at the present time to provide vehicle doors with reinforcing members or beams that are positioned between the inner and outer door panels and extend longitudinally of the vehicle to provide additional protection for the vehicle occupants against transversely and/or longitudinally directed impacts. Conventionally, the reinforcing beam is applied to a door by welding or otherwise securing it to one panel prior to the securing of the two panels to one another. In accordance with the invention, however, a reinforcing cartridge assembly 14 comprises a beam 15, preferably of box configuration, formed of steel or the like having an end plate 16 at one end and an enlargement 17 at its opposite end. In the preferred embodiment of the invention the enlargement 17 is provided with vertically spaced hinges 18 adapted to be secured in any suitable way to the forward frame member 2 of the vehicle, thereby enabling the beam 15 to be swung about a generally vertical axis.

To assemble the door 5 with the reinforcement 14, the smaller end of the beam 15 may be introduced to the cavity 11 by aligning the beam with the opening 12 and telescoping the door over the beam until the web 9 abuts flanges 19 at opposite ends of the extension 17. To facilitate such relative movement of the door and beam, the door is equipped with guide members 20 on either or both of the inner and outer panels and on which the beam may be supported and/or guided. The guides 20 are recessed inwardly of the forward end of the cavity 11 to avoid interference with the enlargement 17 of the beam.

The length of the beam preferably corresponds to the length of the door, thereby enabling the end plate 16 of the beam to abut the rearward web 10. In these positions of the parts the flanges 19 and the end plate 16 may be bolted, welded, or otherwise suitably fixed to the respective webs 9 and 10 so as to secure the door 5 and reinforcement beam 15 to one another in assembled relation. When the door and reinforcement cartridge are assembled, the outer panel 8 of the door overlies and obscures the flanges 19.

If the window opening 6 is one in which a vertically movable windowpane or glass is to be accommodated, the cartridge assembly 14 includes a pair of spaced apart guide rails 21 secured to the beam 15 and between which a window glass 22 is slideably accommodated. Operating means 23 for raising and lowering the window glass comprises a crank arm 24 pivoted at 25 to the beam 15 and terminating at one end in a pin 26 that is accommodated in a slot 27 formed in a channel-shaped glass support 28 in which the lower end of the glass 22 is secured in a conventional manner.

The opposite end of the operating arm 24 carries a toothed gear segment 29 which meshes with a pinion gear 30 that is fixed on a pin 31 journaled in the beam 15. Rotation of the pinion 30 in one direction effects raising of the glass 22 and rotation of the pinion in the opposite direction effects lowering of the glass, as is conventional.

Although the mechanism for raising and lowering the window glass is disclosed as being manually operable, it will be understood that electrical, tape, or cable operating means of conventional kind can be used if desired.

It is preferred that the end plate 16 at the rearward end of the beam 15 be fitted with a carrier 32 (FIGS. 1 and 3) on which is mounted one half of a conventional door latch 33 which cooperates with the other half 34 (FIG. 1) mounted on the rearward frame member 3 of the vehicle. The latch itself forms no part of the invention and may constitute any suitable, conventional latch mechanism. An operating link 35 of conventional construction is mounted on the beam 15 to enable release of the latch to be effected when desired. The link 35 includes a tongue 36 that projects toward the inner door panel 7 that is provided with an appropriate opening for the accommodation of a window crank 36a and a door handle 37 that are connected to the pinion pin 31 and the tongue 36, respectively, so as to enable the window operating mechanism and the door latch to be operated from within the vehicle.

Although not shown, the door will be fitted with an external latch release of conventional construction to enable the door to be opened from outside the vehicle.

Figure 4:
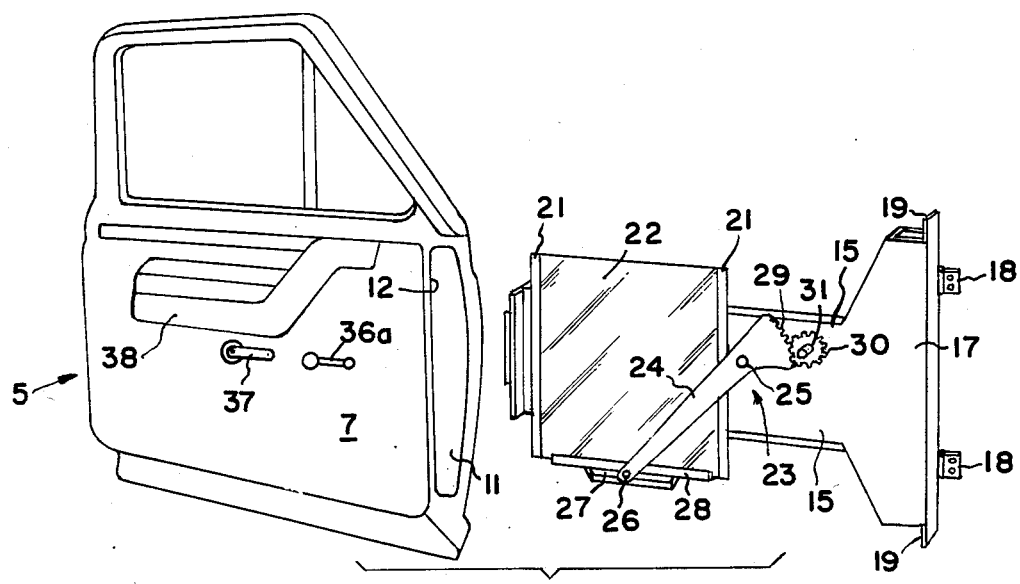
FIG. 4 is a view similar to FIG. 2, but illustrating the opposite sides of the components.

As is shown in FIG. 4, the inner panel 7 is fitted with appropriate decorative material, including an arm rest 38, as an integral part of the panel. It will be understood, however, that the inner panel may be a metal or plastic member to which an a separate trim panel is removably or permanently secured.

Figure 5:
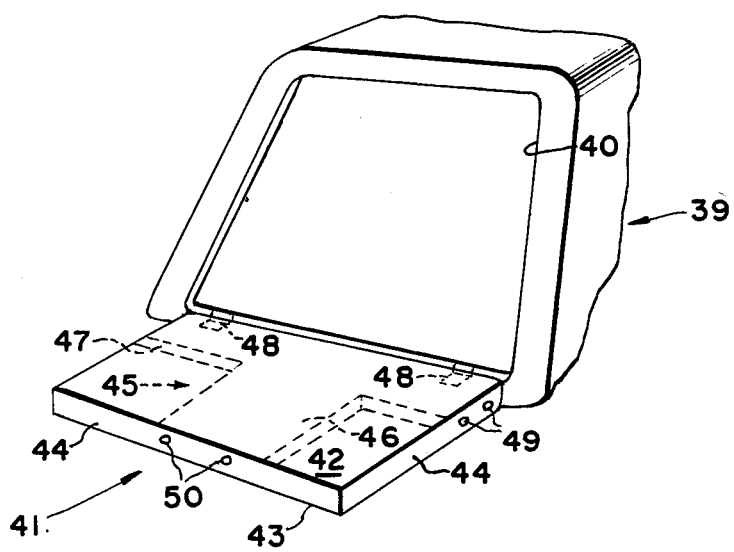
FIG. 5 is a fragmentary, isometric, largely diagrammatic view illustrating the application of the invention to the tailgate of a station wagon.

FIG. 5 illustrates the rear end of a station wagon 39 or the like having an opening 40 that normally is closed by a tailgate 41. The tailgate has inner and outer panels 42, 43 that are spaced apart by webs 44 so as to provide a cavity for the accommodation of a T-shaped reinforcement cartridge assembly 45. The assembly 45 comprises a beam 46 provided with an enlargement 47 at one end. The assembly 45 may be slid into the tailgate between the panels 42 and 43 via an opening (not shown) formed in the web between the panels at the lower end of the tailgate.

The enlargement 47 includes hinges 48 by means of which the cartridge assembly is hinged to the body of the station wagon for swinging movements about a substantially horizontal axis. Suitable bolts or the like 49 secure opposite ends of the beam enlargement 47 to the adjacent webs 44 of the tailgate. The free end of the beam 46 abuts the endmost web 44 of the tailgate and is fixed to the latter by suitable bolts 50 or the like.

Although not shown, it will be understood that window glass supporting and operating means, as well as tailgate latch operating means, may be incorporated in the cartridge assembly 45 and fixed to the beam 46 in a manner like that disclosed in the earlier described embodiment. It also will be understood that the embodiment shown in FIG. 5 is equally applicable to those vehicles which have a closure hinged at its upper end.

Several significant advantages accrue from the construction disclosed herein. For example, the ability to secure the window glass, its operating mechanism, and the door latch operating linkage to the reinforcement cartridge assembly prior to its assembly with the door facilitates greatly the mounting of such devices. Further, the ability of the reinforcing beam to be hinged to the vehicle prior to its assembly with the door greatly facilitates the connection of the door to the vehicle. In addition, the ability of the door to be assembled with the beam simply by relative telescoping movement thereof enables an extremely fast and easy assembly to be achieved.

An additional advantage of providing hinges on the beam rather than on the door itself is that a substantially closer fit can be obtained between the leading edge of the door and the adjacent edge of the vehicle body at the forward frame member 2. In present constructions the hinges carried by the door are supported by the web thereof and are so positioned as to be wholly concealed when the door is in its closed position. As a consequence, the leading edge of the outer door panel must pass inwardly of the trailing or confronting edge of the adjacent fender or body member of the vehicle when the door is swung open. To ensure such movement without binding engagement between these leading and trailing edges, they usually are spaced apart by an undesirably large gap or margin. In the present invention, however, the leading edge of the outer door panel need not move inwardly of the trailing edge of the confronting body member upon opening of the door. Thus, the relatively large margin heretofore required by conventional constructions is not required in the construction herein disclosed.

In the preferred embodiments the length of the reinforcing beam corresponds substantially to the length of the doorway. The advantage of this relationship is that, when the closure is in its doorway-closing position, any impact to which the vehicle may be subjected is less likely to cause collapse of the vehicle by crushing of the closure and consequent failure of the vehicle frame on opposite sides of the doorway.

The disclosed embodiments are representative of presently preferred forms of the invention, but are intended to be illustrative rather than definitive thereof. The invention is defined in the claims.

We claim:

1. A vehicle closure and reinforcement assembly comprising a closure having a cavity therein extending from one edge of said closure toward its opposite edge; a reinforcing member slidably accommodated in and occupying said cavity, said reinforcing member including hinge means at one end thereof for mounting the reinforcing member for swinging movements; and means securing said reinforcing member to said closure.

2. The assembly according to claim 1 wherein said reinforcing member is wider at one end thereof than at the other, and including a pair of spaced apart hinge members at said one end of said reinforcing member for mounting the latter for hinging movements.

3. The assembly according to claim 1 wherein said closure has first and second panels between which said cavity is located, said cavity being in communication with a slot between said first and second panel members through which a window glass may pass, and means carried by said reinforcing member for supporting said glass.

4. The assembly according to claim 3 including guide means carried by said reinforcement member and in guiding engagement with said glass.

5. The assembly according to claim 4 including means connected to said glass supporting means for moving said glass in opposite directions relative to said closure.

6. The assembly according to claim 1 including latch means carried by said reinforcing member at one end thereof.

7. The assembly according to claim 6 including mounting means carried by said reinforcing member at its opposite end for mounting said assembly on a vehicle.

8. The assembly according to claim 6 including latch operating means carried by said reinforcing member and connected to said latch means.

9. The assembly according to claim 1 including a pair of spaced apart hinges carried by said reinforcing member at one end thereof for hingedly mounting said assembly on a vehicle.

10. The assembly according to claim 1 including guide means on said closure in engagement with said reinforcing member.

11. A vehicle door and reinforcement assembly comprising a door having first and second panels spaced apart by first and second webs at opposite ends of said panels, at least one of said webs having an opening therein; and a reinforcing member accommodated in the space between said panels, the opening in said one of said webs being sufficiently large to enable said reinforcing member to be slid via said opening into the space between said panels, said reinforcing member including means carried by said reinforcing member at one end thereof for mounting said assembly on a vehicle.

12. The assembly according to claim 11 wherein the other of said webs has an opening therein in axial alignment with said reinforcing member, the openings in said webs being different in size.

13. The assembly according to claim 11 wherein said space communicates with a slot between said panels through which a window glass may pass, and means carried by said reinforcing member for supporting said glass.

14. The assembly according to claim 13 including guide means carried by said reinforcing member and in guiding engagement with said glass.

15. The assembly according to claim 13 including means connected to said glass supporting means for moving said glass in opposite directions relative to said door.

16. The assembly according to claim 11 including means on said door for guiding said reinforcing member as it is slid into said space.

17. The assembly according to claim 11 including means on said door for supporting said reinforcing member in said space.

18. A method of assembling a door having a cavity therein with a vehicle having a doorway between spaced vehicle frame members, said method comprising hinging to one of said frame members one end of a reinforcing member of such length as substantially to span said doorway; introducing the opposite end of said reinforcing member to an opening at one edge of said door and in communication with said cavity; and sliding said door longitudinally of said reinforcing member to accommodate the latter in the cavity with said one edge of said door adjacent said one end of said reinforcing member.

19. The method according to claim 18 including securing said door to said reinforcing member.

20. The method according to claim 18 including assembling a window glass with said reinforcing member prior to the introduction of said reinforcing member to said cavity.

21. The method according to claim 18 including assembling with said reinforcing member prior to its introduction to said cavity an adjustable position window glass support and a window glass supported by such support.

22. The method according to claim 21 wherein said window glass support includes means for adjusting the position thereof.

23. A reinforced vehicle door construction comprising a vehicle door having a cavity therein and an opening in one lateral edge thereof in communication with said cavity; a beam slidably accommodated in said cavity and being of such length as substantially to span the width of said door; and means for securing said beam to said vehicle door.

24. The construction according to claim 23 including means for hinging said beam at one end thereof to a vehicle frame.

25. The construction according to claim 23 including window glass support means carried by said beam.

26. The construction according to claim 25 wherein said glass support means is adjustable, and including means carried by said beam for adjusting the position of said glass support means.

27. The construction according to claim 23 including door latching means carried by said beam at one end thereof.

28. The construction according to claim 27 including hinge means carried by said beam at its other end for hinging said beam to a vehicle frame.

29. A mehtod of assembling a door having a cavity therein with a door frame which defines a doorway, said method comprising hinging to said door frame one end of a reinforcing member of such length as substantially to span said doorway; intorducing the opposite end of said reinforcing member to an opening at one edge of said door and in communication with said cavity; and sliding said door longitudinally of said reinforcing member to accommdate the latter in the cavity with said one edge of said door adjacent said one end of said reinforcing member.

30. The method according to claim 29 including securing said door to said reinforcing member.

31. A reinforced door construction comprising a door having a cavity therein and an opening in one lateral edge thereof in communication with said cavity; a beam slidably accommodated in said cavity and being of such length as substantially to span the width of said door; and means for securing said beam to said door.

32. The construction according to claim 31 further including means for hinging said beam at one end thereof to a door frame.

33. A vehicle door reinforcing cartridge assembly, comprising:
 a beam having one end and an other end;
 hinge means attached to the beam and positioned near the one end of the beam for swingably mounting the beam to a vehicle door frame; and
 means carried by the beam for supporting a window glass.

34. A door and reinforcement assembly comprising a door having a cavity therein extending from one edge of said door toward its opposite edge; a reinforcing member slidably accommodated in and occupying said cavity, the reinforcing member including hinge means at one end thereof for mounting the reinforcing member for swinging movements; and means securing said reinforcing member to said door.

* * * * *